United States Patent Office 2,975,306
Patented Mar. 14, 1961

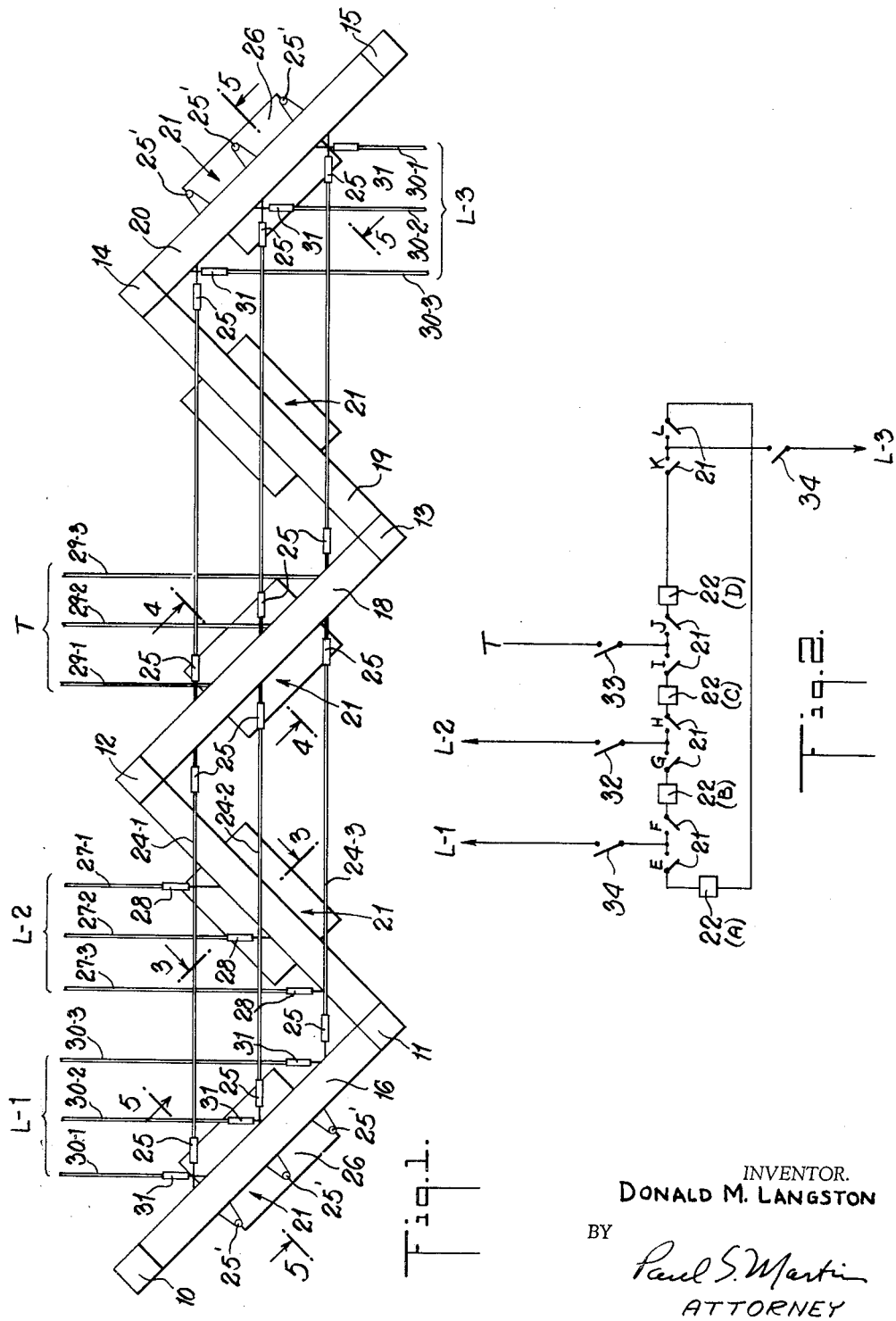

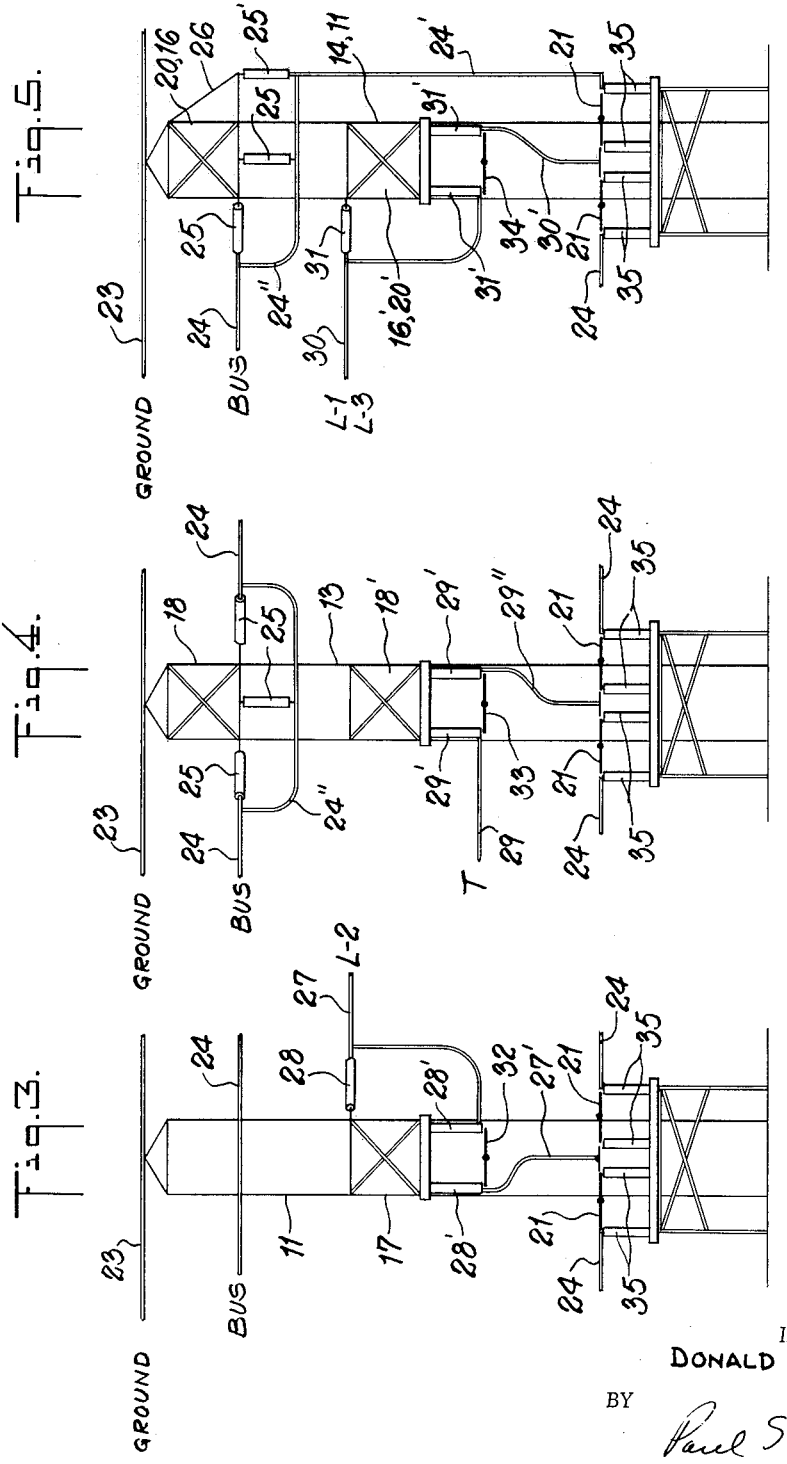

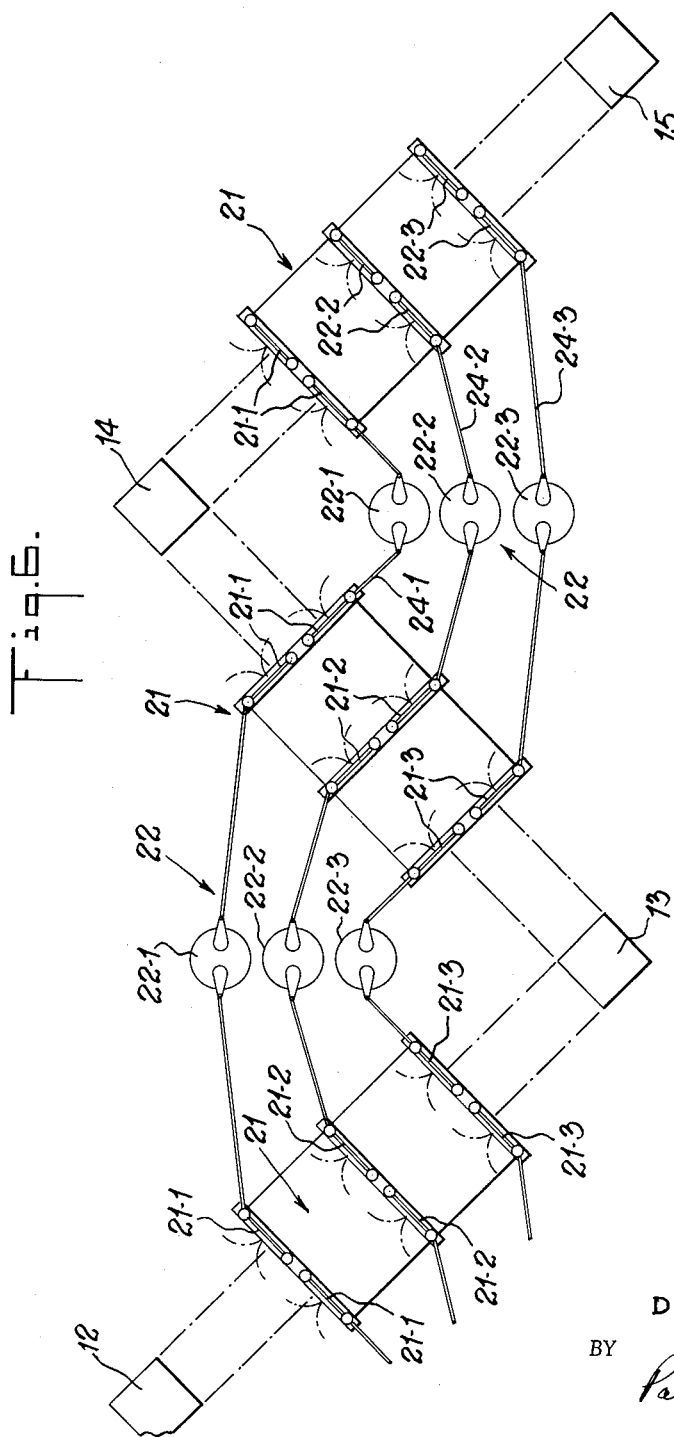

2,975,306

ZIG-ZAG RING BUS

Donald M. Langston, San Jose, Calif., assignor to Federal Pacific Electric Company, a corporation of Delaware Filed Oct. 30, 1958, Ser. No. 770,857

12 Claims. (Cl. 307—147)

This invention relates in general to ring bus structures for transmission line distribution systems.

In the prior art, it has been common to utilize ring bus systems for electrical distribution wherein a plurality of output lines are connected to one or more input supply transformers or lines. The basic advantage of these rings bus systems resides in the fact that a single additional circuit breaker over and above the number of lines being supplied provides a means for all the lines to be supplied even though a single circuit breaker has dropped out. However, up to now this ring bus system technique has been quite expensive since it required a multitude of towers, cross busses and insulators. Examples of ring bus systems are described in AIEE Transactions paper 56–647 entitled Basic Designs for Large High Voltage Substations by E. G. Norell.

In a typical application of the improved ring bus system of this invention, there is a saving of 10% in steel weight for the towers, 60% in footings, cross busses are eliminated thereby saving 6 strings of insulators per bay and accessibility to the oil circuit breakers is improved. This is due to the fact that the number of towers required is only two more than the total number of connected power lines, including both supply and distribution lines.

Accordingly, it is an important object of this invention to provide a novel ring bus design for use in electrical distribution systems in large, high voltage substations and similar installations.

It is a further object of this invention to provide a novel ring bus system to realize a saving in material utilized to construct the system.

An important feature of this invention resides in the provision of a ring bus system wherein the towers are arranged in a zig-zag formation. One of the advantages of this configuration of towers is that the oil circuit breakers in the system are much more accessible than in the ring bus systems of the prior art.

Other objects, features and advantages of this invention will be apparent in the course of the following description when taken in connection with the accompanying drawings wherein:

Figure 1 is a plan view of a typical zig-zag ring bus structure of the invention for one input supply power line and three output power lines for a three-phase system, Figure 2 is a single-line schematic diagram showing the circuit of the ring bus system of Figure 1 and the relationship of the circuit breakers, disconnect switches and input and output power lines, Figures 3, 4 and 5 are cross-sectional views taken respectively along the lines 3—3, 4—4, and 5—5 of Figure 1, there being two lines 5—5 and the corresponding cross-sectional views being identical, and Figure 6 is an enlarged portion of the system in Figure 1 including a plan view of the tops of oil circuit breakers in the system.

The illustrations are diagrammatic in part, in order to simplify the drawings and render them more readily understandable. In the plan views of Figures 1 and 6, all three phases of the system are shown, whereas in the other figures, the elements are represented in a more general manner. However, it should be understood that any discussion of a single phase of the system is equally valid for all three phases of a three-phase system.

In the drawings, wherein for the purpose of illustration, is shown a preferred embodiment of the invention, towers 10, 11, 12, 13, 14 and 15 are arranged in a typical novel zig-zag installation. Shield wire 23 is suitably connected to the peak of each of the towers which are grounded. Truss or beam 16 is carried between towers 10 and 11 at the upper level while truss 16' (see Figure 5) is carried between the same towers at a lower level. Truss 17 is carried between towers 11 and 12 at the lower level. Truss 18 is carried between towers 12 and 13 at the upper level and truss 18' (Figure 4) is carried between the same towers at the lower level. Truss 19 is carried between towers 13 and 14 at the lower level. Truss 20 is carried between towers 14 and 15 at the upper level and truss 20' is carried between the same towers at the lower level. All of the towers and trusses are suitably formed of conventional fabricated steel frame work and reinforcements.

The disconnect switches 21 in the ring bus circuit include the individual switches 21–1, 21–2 and 21–3 for the several phases (Figure 6). Similarly, the oil circuit breakers 22 include individual units 22–1, 22–2 and 22–3 for the several phases. The ring bus has been generally designated 24. The vertical lead for the bus at the physical ends of the ring installation have been designated as 24' (Figure 5) and the jumper leads to carry bus 24 under the upper trusses are designated 24''. Within the ring, at the circuit breaker level, the individual phases of the ring bus are designated 24–1, 24–2 and 24–3 (Figure 6). Insulators 25 provide insulating mechanical connection from the ring bus conductors to the supporting structures and support jumpers 24''. Insulator 25', which is supported by strut 26, serves to support vertical wire 24' and insulate it from the supporting structure.

The various lines are interconnected by the zig-zag ring bus system, including the transformer or input supply line T and distribution lines L–1, L–2 and L–3.

The conductors of distribution line L–2 are generally designated 27 and those for the individual phases are denominated 27–1, 27–2 and 27–3. Each line 27 is insulated from the supporting structure by a strain insulator 28 (Figure 3) and is connected to a line disconnect switch 32 mounted on insulators 28'. Lead 27' extends from switch 32 to a pair of disconnect switches 21 that are mounted on insulators 35.

The conductors 29 for supply line T include individual phase conductors 29–1, 29–2 and 29–3. Each conductor 29 is carried to a line disconnect switch 33 (Figure 4) carried by insulators 29'. Lead 29'' connects line disconnect switch 33 to a pair of circuit-breaker disconnect switches 21.

The conductors 30 of distribution lines L–1 and L–3 include individual phase wires 30–1, 30–2 and 30–3. Each conductor 30 is supported by strain insulator 31 (Figure 5) and is connected to line disconnect switch 34 carried by insulators 31'. Lead 30' connects switch 34 to circuit-breaker disconnect switches 21.

Conventional auxiliary equipment, such as are employed for carrier current control, have been omitted from the drawings.

Strain bus 24, forming parts of the ring bus, is carried from one end of the zig-zag structure to the other end at the level of the upper trusses 16, 18 and 20 in the system and are carried to the line disconnect switches 21 at each end of the system by means of vertical leads 24'. Leads 24' are supported by insulators 25'.

Circuit breakers 22, which are preferably of the oil type but may be of any other appropriate type, are positioned within the triangle formed by three successive towers. By using a zig-zag pattern for the tower placement and positioning the circuit breakers in the triangles formed by each group of three successive towers, the number of vertical leads, cross busses, insulators and towers are materially reduced, compared to the known ring bus based on rectangular tower distribution. Among other advantages, the portion of the novel ring bus system at the ground level does not interfere with any other portions of the system such as will require raising leads to a different level to avoid the conductors interfering with each other.

Figure 2 serves to demonstrate the operation of the ring bus system utilizing the unique zig-zag design and is a single line diagram of such a system. In the figure, the input line T feeds power through line disconnect switch 33 at a point between switches 21–I and 21–J. The output lines L–1, L–2, and L–3 are connected to the ring bus through line disconnect switches 34, 32 and 34, respectively. Line L–1 is fed from the system at a point between switches 21–E and 21–F, line L–2 is fed from a point between switches 21–G and 21–H, and line L–3 is fed from a point between switches 21–K and 21–L. Circuit breakers 22(A), 22(B), 22(C) and 22(D) are located respectively between switches L and E, between switches F and G, between switches H and I, and between switches J and K.

In operation, assuming all circuit breakers 22 are operatively closed, the power will be carried by plural paths from line T to each of the distribution lines L, from line T in opposite directions around the ring to each line L–1, L–2, and L–3. This presumes that switches E, F, G, H, I, J, K and L are closed. To take a line off the ring, both circuit breakers at opposite sides of that line have to be tripped and opened. However, any one of the circuit breakers can be cut out of the ring, as for servicing, and the system will still function. For example, circuit breaker 22(C) can be opened, and switches 21–H and 21–I can then be opened to take circuit breaker 22(C) out of the system so that it can be worked on. All the lines L–1, L–2 and L–3 still retain a power supply path through the remaining part of the ring bus, and they retain circuit breaker protection. Only one more circuit breaker is needed than there are distribution lines, yet any one of the circuit breakers can be taken out of service without interrupting service to any line. The full advantages of the ring bus system are retained, and the economies and improvements are realized, in the construction described, and for a system having any number of phases.

While the invention has been disclosed in relation to specific examples and in a specific embodiment, it is not intended to be limiting, for obvious modifications will occur to those skilled in the art without departing from the spirit and scope of the invention.

What is claimed as new and desired to be secured by Letters Patent is:

1. A ring bus for an electrical distribution system having a plurality of interconnected power lines, including a plurality of circuit breakers and twice said plurality of disconnect switches connected in a closed loop circuit with one of said disconnect switches on each side of each said circuit breaker, and with the disconnect switches on each side of each said circuit breaker having respective connections to the disconnect switches of the adjacent circuit breakers in the loop circuit, each of said power lines being connected to a respective one of said connections, and a supporting structure for said disconnect switches and said power lines, said structure including a series of towers positioned in a zig-zag pattern and each tower having connecting framework to the next tower in the zig-zag pattern, there being two more towers than power lines.

2. A ring bus for an electrical distribution system having a plurality of interconnected power lines, including a plurality of circuit breakers and twice said plurality of disconnect switches connected in a closed loop circuit with one of said disconnect switches on each side of each said circuit breaker, and with the disconnect switches on each side of each said circuit breaker having respective connections to disconnect switches of the adjacent circuit breakers in the loop circuit, each of said power lines being connected to a respective one of said connections, and a supporting structure for said disconnect switches and said power lines, said structure including a series of towers positioned in a zig-zag pattern and each tower having connecting framework to the next tower in the zig-zag pattern, there being two more towers than power lines and each said circuit breaker being positioned substantially within the triangle defined by each group of three consecutive towers.

3. A ring bus for an electrical distribution system having a plurality of interconnected power lines and an equal plurality of circuit breakers, said circuit breakers having connections to others of said circuit breakers in a loop circuit and each of said power lines being connected to a respective one of said connections, a supporting structure for said power lines including a series of towers arranged in a zig-zag pattern and each tower having connecting framework to the next tower of the series, there being two more towers than there are power lines, each of said circuit breakers being positioned substantially within the triangle defined by three consecutive towers.

4. A ring bus for an electrical distribution system for three-phase power including a plurality of three-phase power lines, an equal plurality of three-phase circuit breakers and a supporting structure for said power lines, said circuit breakers having connections to others of said circuit breakers in a loop circuit and said power lines being connected to said connections, respectively, said supporting structure including a series of towers, there being two more towers than there are three-phase power lines, said towers being positioned in a zig-zag pattern and having connecting framework to the next tower in the series.

5. A ring bus for an electrical distribution system for three-phase power including a plurality of three-phase power lines, an equal plurality of three-phase circuit breakers and a supporting structure for said power lines, said circuit breakers having connections to others of said circuit breakers in a loop circuit and said power lines being connected to said connections, respectively, said supporting structure including a series of towers, there being two more towers than there are three-phase power lines, said towers being positioned in a zig-zag pattern and having connecting framework to the next tower in the series, each of said three-phase circuit breakers being positioned substantially within the triangle defined by three consecutive towers in said series.

6. A ring bus for an electrical distribution system having a plurality of interconnected three-phase power lines, including a plurality of three-phase circuit breakers and twce said plurality of disconnect switches connected in a closed loop circuit with one of said disconnect switches on each side of each said three-phase circuit breaker, and with the disconnect switches on each side of each said three-phase circuit breaker having respective connections to the respective disconnect switches of the next adjacent three-phase circuit breakers in the loop circuit, each of said three-phase power lines being connected to a respective one of said connections, and a supporting structure for said disconnect switches and said three-phase power lines, said structure including a series of towers positioned in a zig-zag pattern and each tower having connecting framework to the next tower in the pattern, there being two more towers than three-phase power lines.

7. A ring bus for an electrical distribution system having a plurality of interconnected power lines, including a plurality of three-phase circuit breakers and twice said plurality of disconnect switches connected in a closed loop circuit with one of said disconnect switches on each side of each of said three-phase circuit breakers, and with the disconnect switches on each side of each said three-phase circuit breaker having respective connections to the disconnect switches of the next three-phase circuit breaker in the loop circuit, each of said three-phase power lines being connected to a respective one of said connections, and a supporting structure for said disconnect switches and said three-phase power lines, said structure including a series of towers positioned in a zig-zag pattern and each tower having connecting framework to the next tower in the pattern, there being two more towers than three-phase power lines and each said three-phase circuit breaker being positioned substantially within the triangle defined by three consecutive towers.

8. A circuit breaker station, including a supply transmission line, plural protected transmission lines, a protective circuit breaker electrically interposed between each supply transmission line and a respective protected transmission line, two rows of structural towers disposed in a zig-zag pattern and having zig-zag bridging structures interconnecting each tower of one row with the next adjacent tower or towers of the other row, thus forming a series of angled bays as viewed from above, said transmission lines being mechanically secured to respective bridging structures, and said circuit breakers being disposed in said bays.

9. A ring bus for an electrical distribution system having a plurality of inter-connected polyphase power lines and an equal plurality of groups of circuit breakers, one circuit breaker in each of said groups of circuit breakers having connections to corresponding circuit breakers of others of said groups of circuit breakers in polyphase loop circuits and each of said polyphase power lines being connected to corresponding connections of one of said groups of circuit breakers, a supporting structure for said power lines including a series of towers arranged in a zig-zag pattern and each tower having a generally straight long and narrow elevated connecting framework to the next tower of the series, there being two more towers than power lines and each power line extending in tension from one of the aforesaid connecting frameworks at an angle thereto differing substantially from zero degrees and from 90°.

10. A ring bus for an electrical distribution system having a plurality of inter-connected power lines, including multiple polyphase distribution lines and at least one polyphase supply line, and an equal plurality of groups of circuit breakers, one circuit breaker in each of said groups having connections to corresponding circuit breakers of others of said groups in polyphase loop circuits, and each of said power lines being connected to corresponding ones of the connections to a group of circuit breakers, a supporting structure for said power lines including a series of towers arranged in a zig-zag pattern and each tower having an elevated elongated connecting framework to the next tower of the series, there being two more towers than polyphase power lines and each power line extending in tension from a respective framework aforesaid at a prominent angle thereto.

11. An electrical distribution system including a supporting structure, a plurality of generally parallel but mutually offset polyphase power lines supported by said supporting structure, and electrical means at said supporting structure for inter-connecting said power lines, said supporting structure including a series of towers arranged in a zig-zag pattern in which said towers are disposed alternately in a pair of parallel rows, an elevated connecting framework interconnecting said towers, said power lines extending in tension from said framework and generally perpendicular to said parallel rows, there being two more towers than the number of said polyphase power lines.

12. An electrical distribution system including a supporting structure, a plurality of generally parallel but mutually offset polyphase power lines supported by said supporting structure, and electrical means at said supporting structure for inter-connecting said power lines, said supporting structure including a series of towers arranged in a zig-zag pattern in which said towers are disposed alternately in a pair of parallel rows, an elongated elevated framework connecting each tower of the series to the next tower of the series, each of said power lines extending in tension from one of said elongated frameworks at a prominent angle relative thereto and there being a greater number of power lines than half the number of said towers.

References Cited in the file of this patent
UNITED STATES PATENTS
1,815,823   Barton _____ July 21, 1931